United States Patent
Kim et al.

(10) Patent No.: US 9,598,119 B2
(45) Date of Patent: Mar. 21, 2017

(54) VEHICLE BODY REINFORCEMENT STRUCTURE

(71) Applicants: HYUNDAI MOTOR COMPANY, Seoul (KR); KIA MOTORS CORPORATION, Seoul (KR)

(72) Inventors: Hag Kyun Kim, Suwon-si (KR); Joo Tae Oh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/727,312

(22) Filed: Jun. 1, 2015

(65) Prior Publication Data

US 2016/0129942 A1 May 12, 2016

(30) Foreign Application Priority Data

Nov. 10, 2014 (KR) .......................... 10-2014-0155688

(51) Int. Cl.
*B62D 25/20* (2006.01)
(52) U.S. Cl.
CPC ................. *B62D 25/2018* (2013.01)
(58) Field of Classification Search
CPC ................ B62D 25/2018; B62D 25/2045
USPC .................... 296/193.07, 187.06, 70
See application file for complete search history.

(56) References Cited

U.S. PATENT DOCUMENTS

| | | | | |
|---|---|---|---|---|
| 6,916,063 | B2* | 7/2005 | Song | B62D 25/2018 296/187.09 |
| 2010/0171340 | A1* | 7/2010 | Yasuhara | B62D 21/11 296/205 |
| 2011/0272972 | A1 | 11/2011 | Takayanagi | |
| 2012/0212009 | A1* | 8/2012 | Ishizono | B62D 25/025 296/193.07 |
| 2012/0242113 | A1* | 9/2012 | Yasuhara | B62D 21/11 296/193.07 |
| 2012/0256446 | A1* | 10/2012 | Yasuhara | B62D 21/11 296/193.07 |
| 2013/0049407 | A1* | 2/2013 | Kageyama | B62D 21/10 296/204 |
| 2013/0069393 | A1* | 3/2013 | Kihara | B62D 25/082 296/203.02 |
| 2013/0341969 | A1* | 12/2013 | Fujii | B62D 25/2036 296/193.07 |
| 2014/0333056 | A1* | 11/2014 | Yoshida | B62D 21/155 280/834 |

(Continued)

FOREIGN PATENT DOCUMENTS

JP 5-270443 10/1993
JP 2006-193086 A 7/2006

(Continued)

*Primary Examiner* — Jason S Morrow
(74) *Attorney, Agent, or Firm* — McDermott Will & Emery LLP

(57) ABSTRACT

A vehicle body reinforcement structure includes a dash panel separating an engine compartment and an interior of a vehicle. A floor member extends in a longitudinal direction of the vehicle and is in closely contact with a floor of a vehicle body to reinforce rigidity of the floor of the vehicle body. A front side member extends in the longitudinal direction of the vehicle is connected to and overlaps with the floor member inside the dash panel.

6 Claims, 5 Drawing Sheets

(56) References Cited

U.S. PATENT DOCUMENTS

2015/0166107 A1* 6/2015 Delord .................. B62D 21/09
296/187.09

FOREIGN PATENT DOCUMENTS

| JP | 2013-010424 A | 1/2013 |
| JP | 2013-169823 A | 9/2013 |
| KR | 10-0284913 B1 | 3/2001 |
| KR | 10-2005-0022285 A | 3/2005 |

* cited by examiner

VEHICLE BODY REINFORCEMENT STRUCTURE

CROSS-REFERENCE TO RELATED APPLICATION

This application is based on and claims the benefit of priority to Korean Patent Application No. 10-2014-0155688, filed on Nov. 10, 2014 in the Korean Intellectual Property Office, the disclosure of which is incorporated herein in its entirety by reference.

TECHNICAL FIELD

The present disclosure relates to a vehicle body reinforcement structure, and more particularly, to a vehicle body reinforcement structure that effectively distributes collision energy and reduces weight.

BACKGROUND

In recent years, a collision test standard for a vehicle is becoming more stringent and difficult to satisfy to secure passenger safety, and in particular, the number of a reinforcing member to reduce an external impact to an interior space of the vehicle in a front collision has been increasing.

However, since it is desirable to reduce the weight of a vehicle body to improve fuel efficiency, a need exists for a structure that satisfies both the passenger safety and the weight of the vehicle body.

SUMMARY

The present disclosure has been made to solve the above-mentioned problems occurring in the prior art while advantages achieved by the prior art are maintained intact.

An aspect of the present inventive concept provides a vehicle body reinforcement structure that effectively distributes collision energy.

Another aspect of the present inventive concept provides a vehicle body structure that reduces the number of existing reinforcing members and improves performance.

The present disclosure is not limited to the aforementioned objects, but other objects, which are not mentioned above, will be apparent to those skilled in the art from the following description.

According to an exemplary embodiment of the present inventive concept, a vehicle body reinforcement structure includes a dash panel separating an engine compartment and an interior of a vehicle. A floor member extends in a longitudinal direction of the vehicle and is in close contact with a floor of a vehicle body to reinforce rigidity of the floor of the vehicle body. A front side member extends in the longitudinal direction of the vehicle and connected to overlap with the floor member in the dash panel.

According to another exemplary embodiment of the present inventive concept, a vehicle body reinforcement structure includes a floor member extending in a longitudinal direction of a vehicle and closely contacting a floor of a vehicle body to reinforce rigidity of the floor of the vehicle body. A front side member extends in the longitudinal direction of the vehicle and connected to overlap with the floor member. A cross-section of the connection portion of the front side member and the floor member is enclosed by the floor member, the front side member, and the panel side member.

Other detailed contents of the exemplary embodiments are included in the Detailed Description and drawings.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
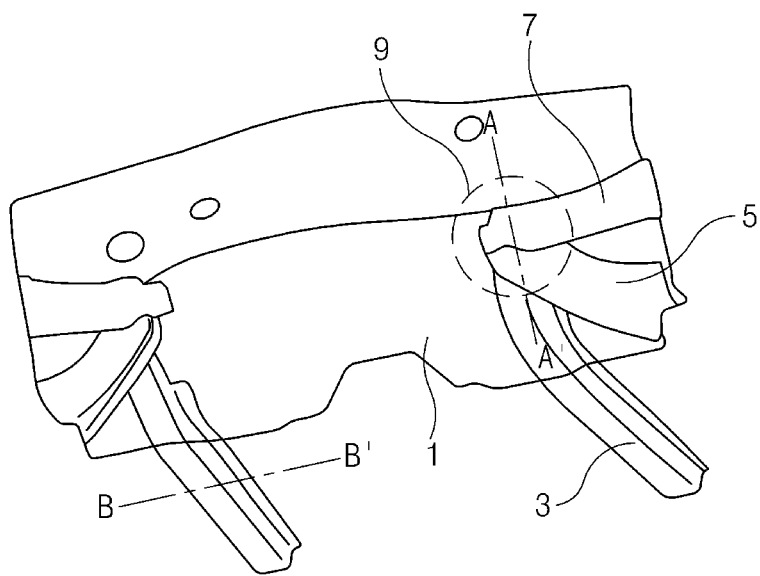
FIG. 1 is a perspective view of a vehicle body reinforcement structure according to an exemplary embodiment of the present inventive concept.

Various advantages and features of the present disclosure and methods accomplishing thereof will become apparent from the following description of exemplary embodiments with reference to the accompanying drawings. However, the present disclosure is not limited to the exemplary embodiment disclosed herein but will be implemented in various forms. The exemplary embodiments introduced herein are provided to make disclosed contents thorough and complete and sufficiently transfer the spirit of the present disclosure to those skilled in the art. Therefore, the present disclosure will be defined only by the appended claims. Like reference numerals indicate like elements throughout the specification.

Hereinafter, the present disclosure will be described with reference to the accompanying drawings for describing a vehicle body reinforcement structure by exemplary embodiments of the present inventive concept.

Figure 2:
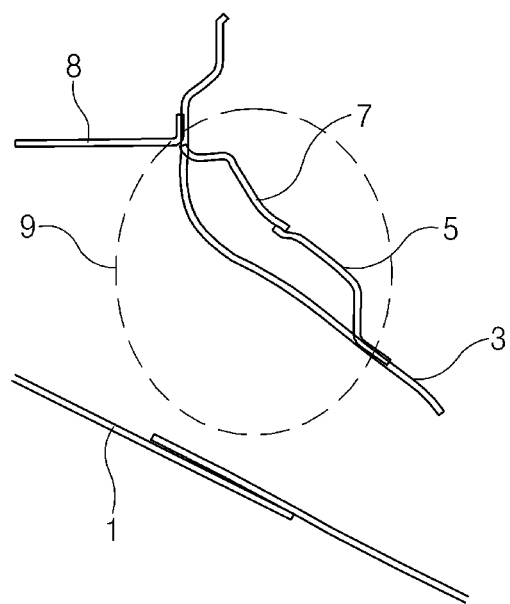
FIG. 2 is a cross-sectional view taken along the line A-A of FIG. 1.
Figure 3:
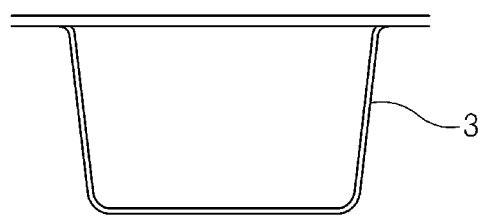
FIG. 3 is a cross-sectional view taken along the line B-B of FIG. 1.

FIG. 1 is a perspective view of a vehicle body reinforcement structure according to an exemplary embodiment of the present inventive concept. FIG. 2 is a cross-sectional view taken along line A-A of FIG. 1. FIG. 3 is a cross-sectional view taken along line B-B of FIG. 1.

Referring to FIGS. 1 to 3, the vehicle body reinforcement structure according to the exemplary embodiment of the present inventive concept includes a dash panel 1 forming an engine compartment. A floor member 3 extends in a longitudinal direction of a vehicle and in a close contact with a floor of a vehicle body to reinforce rigidity of the floor of the vehicle body. A front side member 5 extends in the longitudinal direction of the vehicle body and is connected to the floor member 3 in the dash panel 1 so that a connection cross-section has an enclosed space.

In the vehicle body reinforcement structure according to the present disclosure, the existing dash cross member is eliminated by dividing the dash panel 1 into two pieces and applying a panel integrated member structure, and an interior side upper side member is deleted by direct coupling a passenger room-side member and an engine compartment-side side member.

In the vehicle body reinforcement structure according to the present disclosure, an interior-side upper side member of the existing structure is deleted, and the thickness of the front side member increases to secure interior-side framework intensity. Accordingly, the weight of the vehicle body reinforcement structure decreases by 3.8 Kg as compared with the existing structure.

The vehicle body reinforcement structure according to the present disclosure further includes an engine compartment side member 8 in the engine compartment and connected with the dash panel 1. A panel side member 7, the front side member 5, and the floor member 3 are connected to triple overlap with each other to form a triple connector 9. In this case, the triple connector 9 is formed at each of left and right sides, and each triple connector 9 may not be connected with a dash cross member. The triple connectors 9 are continuously connected so that a cross-section forms an enclosed space.

Figure 4A:
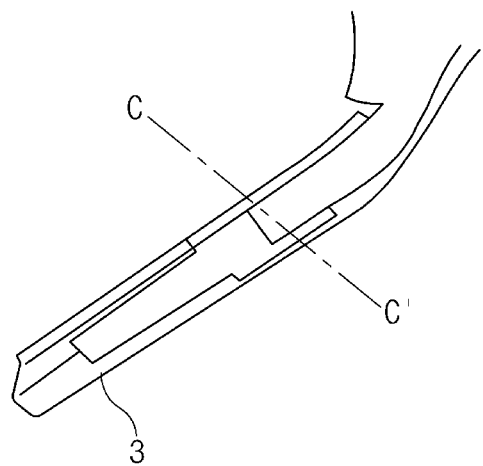
FIG. 4A is a top view of a floor member according to an exemplary embodiment of the present inventive concept.
Figure 4B:
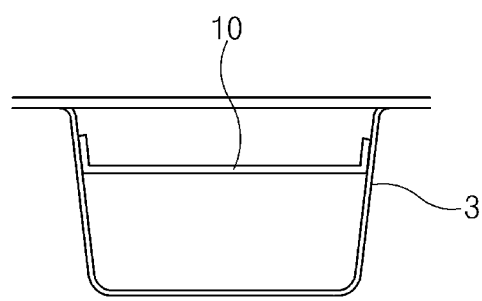
FIG. 4B is a cross-sectional view of a floor member taken along the line C-C of FIG. 4A according to an exemplary embodiment of the present inventive concept.

FIG. 4A is a top view of a floor member according to an exemplary embodiment of the present inventive concept. FIG. 4B is a cross-sectional view of a floor member taken along line C-C according to an exemplary embodiment of the present inventive concept.

Referring to FIGS. 4A and 4B, in the floor member 3, an empty space is formed at a lower end of the floor member 3. A partition 10 is provided horizontally in the empty space so as to be resistant to a bending moment.

Figure 5:
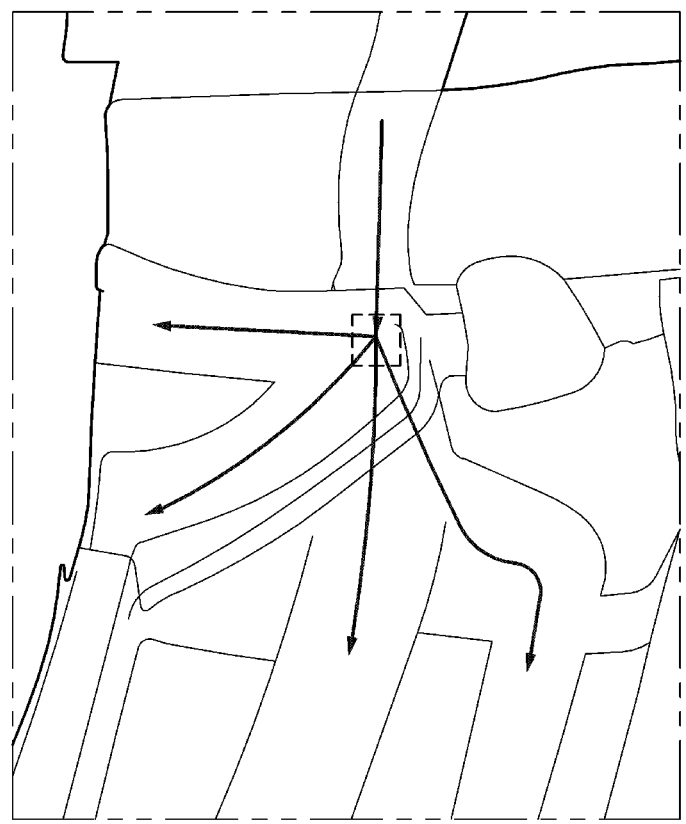
FIG. 5 is a diagram for describing an effect of a vehicle body reinforcement structure according to an exemplary embodiment of the present inventive concept.

FIG. 5 is a diagram for describing an effect of a vehicle body reinforcement structure according to an exemplary embodiment of the present inventive concept.

Referring to FIG. 5, a discontinuous cross-section in the related art becomes continuous due to the triple connector 9 according to the exemplary embodiment of the present inventive concept. Further, an overlap degree of the respective members increases to increase load transfer efficiency.

In addition, the partition 10 reduces a bending degree of the floor member 3 to reduce a deformation degree of the dash panel 1.

If an appropriate collision load path configured in a vehicle body framework is defined, a joining structure in which inter-member cross-section continuity is secured is important in order to minimize a stress concentration phenomenon on the load path and maintain a stress balance in a whole interval of the load path.

Further, sufficient overlap and direct joint between collision members, which are configured by a border between an interior space and outside, need to be considered to maximize the load distributing effect.

Further, an equivalent performance effect may be acquired by separating the dash panel into two pieces and integrated molding of adding a member shape to the dash panel itself as a countermeasure depending on deletion of the existing dash cross member.

Through the vehicle body reinforcement structure according to the exemplary embodiment of the present inventive concept, a collision evaluation standard may be satisfied. Further, a weight decrease by 3.8 kg may be achieved through the weight decrease of the vehicle body and simplification of an assembly process due to a decrease in the number of components and even cost saving equivalent thereto may be achieved (e.g., when 1.4 dollar/Kg is applied, a saving effect of 5.3 dollar/vehicle is achieved).

According to the exemplary embodiment of the present inventive concept, the following effects are provided.

First, the structure of the present disclosure distributes collision energy to a front collision.

Second, the structure of the present disclosure reduces the number of the reinforcing member, but satisfies the collision test standard.

The effects of the present disclosure are not limited to the aforementioned effects, but other effects, which are not mentioned above, will be apparent to those skilled in the art from the description included in the appended claims.

Although the exemplary embodiment of the present inventive concept have been disclosed for illustrative purposes, those skilled in the art will appreciate that various modifications, additions, and substitutions are possible, without departing from the scope and spirit of the disclosure as disclosed in the accompanying claims. Accordingly, such modifications, additions, and substitutions should also be understood to fall within the scope of the present disclosure.

What is claimed is:

1. A vehicle body reinforcement structure comprising:
    a dash panel separating an engine compartment and an interior of a vehicle;
    a floor member extending in a longitudinal direction of the vehicle and closely contacting a floor of a vehicle body to reinforce rigidity of the floor of the vehicle body; and
    a front side member extending in the longitudinal direction of the vehicle body, the front side member having a first edge and a second edge,
    wherein the floor member is connected to and overlaps with the first edge of the front side member in the dash panel,
    wherein the floor member and the second edge of the front side member are connected with a panel side member by overlapping with each other to form a triple connector, and
    wherein the triple connector is continuously connected so that a cross-section of the triple connector forms an enclosed space.

2. The structure according to claim 1, further comprising:
    an engine compartment side member disposed in the engine compartment and connected to the floor member.

3. The structure according to claim 1, wherein the floor member has an empty space formed therein.

4. The structure according to claim 3, wherein the floor member includes a partition in the empty space horizontally to increase rigidity thereof.

5. The structure according to claim 2, wherein the triple connector is formed at left and right sides of the vehicle.

6. The structure according to claim 4, wherein the partition divides the empty space into an upper space and a lower space.

* * * * *